United States Patent Office 3,087,710
Patented Apr. 30, 1963

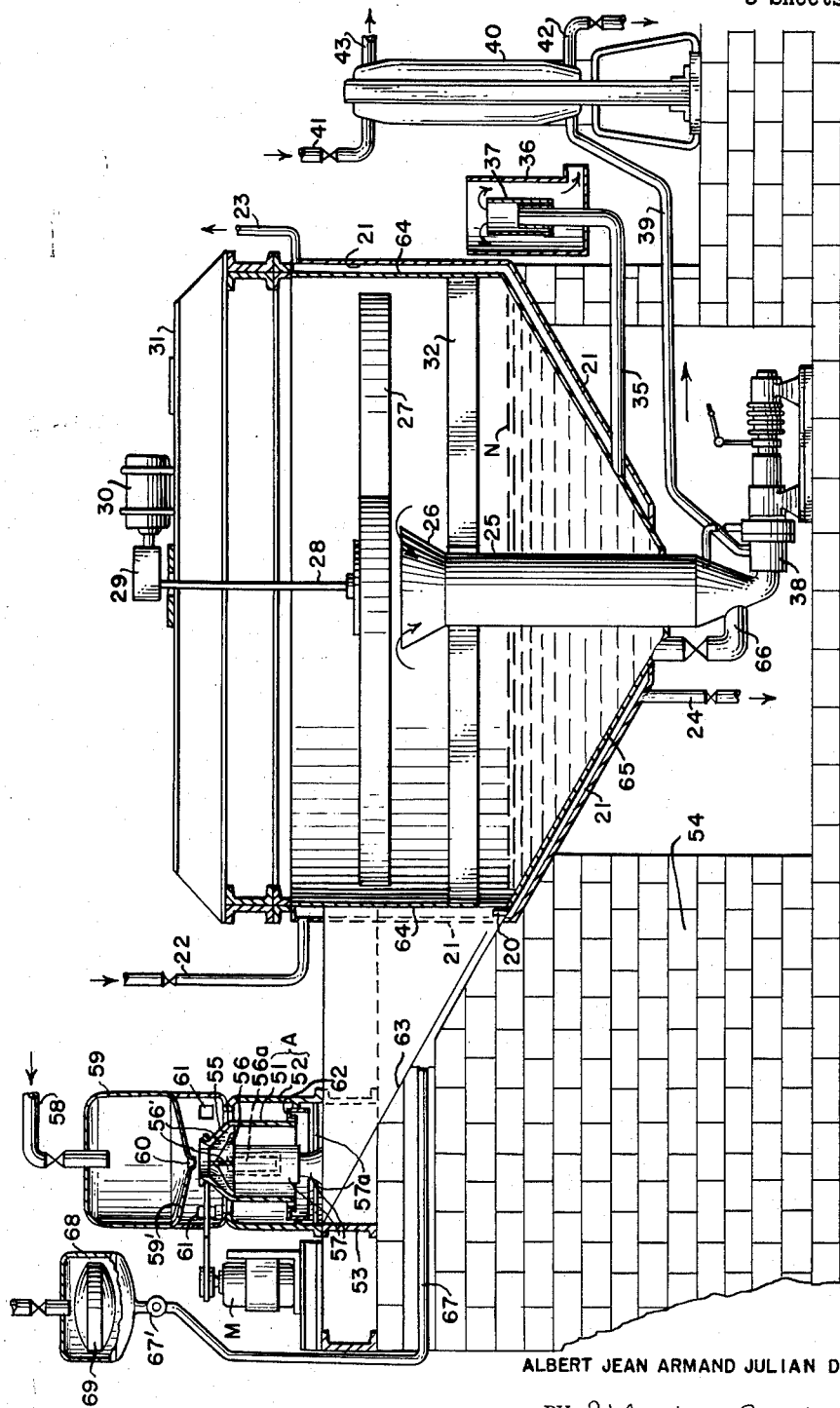

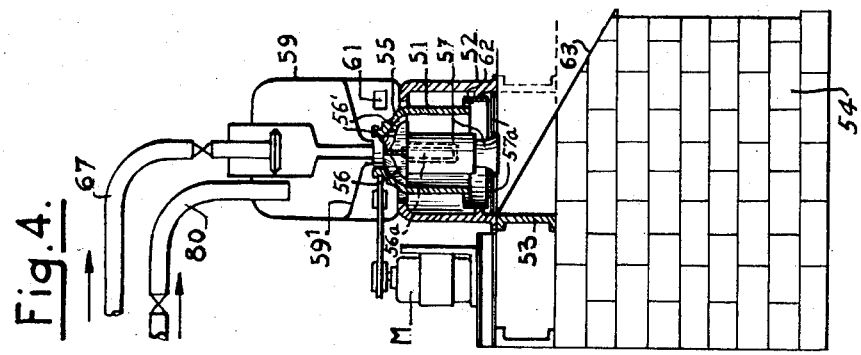
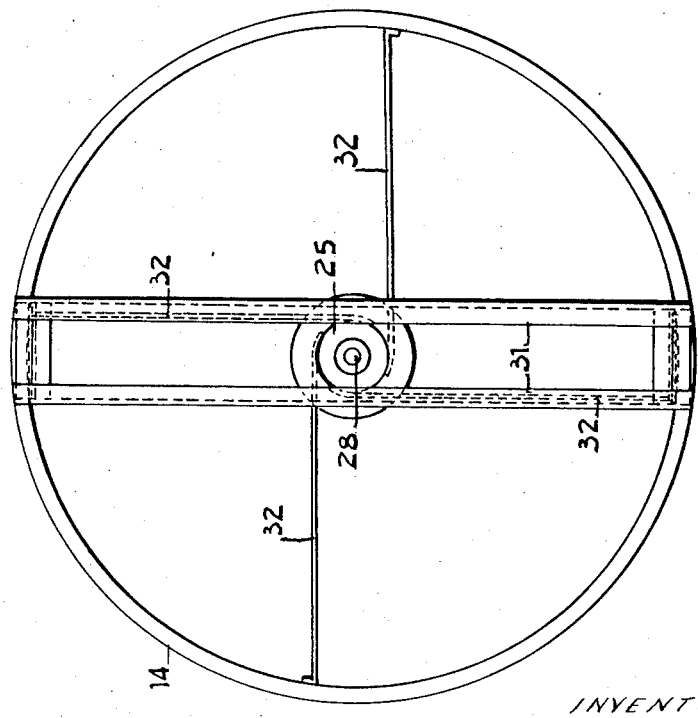

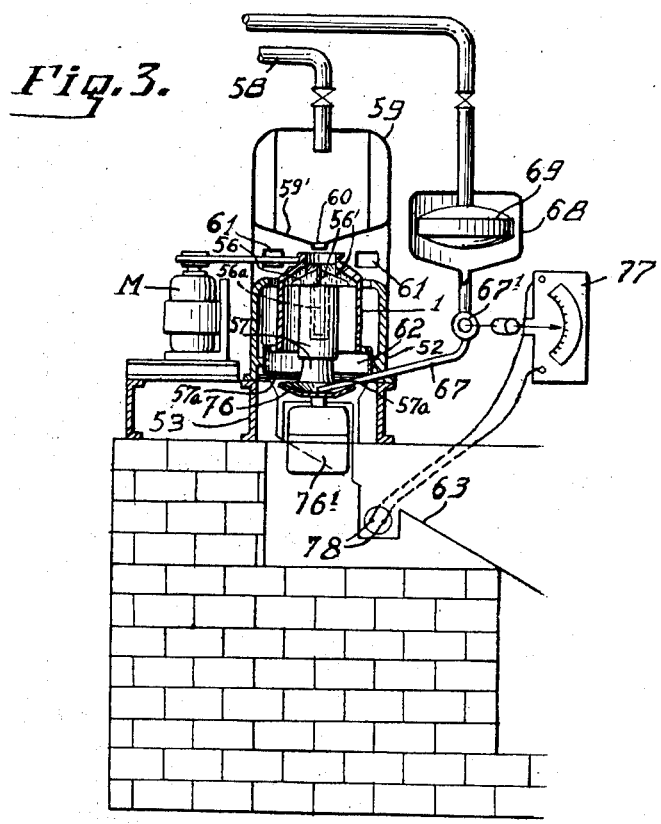

3,087,710
APPARATUS FOR CLARIFYING LIQUIDS CONTAINING SUSPENDED SOLIDS
Albert Jean Armand Julien Dujardin, Remicourt, Belgium, assignor to Ecremeuses Melotte, Societe Anonyme, Remicourt, Belgium, a Belgian company
Filed July 8, 1960, Ser. No. 66,818
Claims priority, application Luxembourg Feb. 10, 1949
3 Claims. (Cl. 261—18)

The present invention relates to apparatus for separating colloidal particles from a liquid phase in which they are suspended and wherein the density of said particles is substantially equal to the density of said liquid phase.

This application is a continuation-in-part of my applications Serial No. 142,866 filed February 7, 1950, now abandoned; Serial No. 353,778 filed May 8, 1953, now abandoned; Serial No. 361,746 filed June 15, 1953, now abandoned; and Serial No. 445,067 filed July 22, 1954, now abandoned, which is a continuation-in-part of Serial No. 142,866.

In accordance with the present invention the process consists in causing the liquid phase with its suspended particles to flow in a continuous manner through a centrifugal apparatus projecting said particles and said liquid in the form of a thin continuous film through a gaseous medium against at least one impact surface for forming an homogeneous emulsion comprising the colloidal suspension together with air in the form of microscopic bubbles dispersed throughout the suspension, transferring the resulting emulsion to a settling tank for permitting the colloids to coagulate imprisoning the microscopic air bubbles and to come on the surface of the liquid forming a spongy agglomerate for inverted decantation.

The entire quantity of liquid to be clarified and containing suspended colloidal particles is submitted to a continous operation of dispersion and impacting in the presence of the surrounding atmosphere or alternatively in the presence of a gaseous medium other than air.

Thereafter the impacted liquid with its homogeneously dispersed suspended particles and microscopic bubbles of gas is transferred to a settling tank at the uppermost level of liquid already standing in the tank permitting the colloids imprisoning the microscopic air bubbles to come to float on the surface of the liquid thereby forming a buoyant spongy agglomerate having an effective density less than the density of the liquid, the said liquid being submitted to a downward movement to seep downwardly from said spongy agglomerate.

In other words, the solid particles coagulate or assemble to form flocs entrapping microscopic bubbles of gas or air, thereby producing a spongy agglomerate which remains at the top of the liquid and the clarified liquid seeps downwardly through the agglomerated solids. The accumulated clarified liquid may be withdrawn from the settling tank, and the agglomerate thereon skimmed off.

The raw colloidal suspension, as it enters the impacting and dispersion apparatus, may already be in such a condition that the colloidal particles tend to assemble together and form flocs.

If this is the case, then in passing through the impacting and dispersion apparatus, any flocs already formed are broken up and the colloidal particles are dispersed throughout the liquid phase along with microscopic bubbles of air or gas. After the impacting and dispersion operation is completed, the solid particles of the resulting mixture will ordinarily remain in such a condition that the dispersed colloidal particles tend to flocculate or coagulate to produce newly formed buoyant flocs when they come to rest in the settling tank.

In the event that the suspension is not in this essential flocculent conditon after the impacting and dispersion operation has been completed, then the suspension must be treated by a suitable method prior to the time when it is at rest in the settling tank, so that upon its arrival at the material already disposed on the liquid contained in the settling tank, the colloidal particles upon coming to rest will immediately start to assemble or coagulate and form flocs. Such treatment may employ conventional physical, chemical, or combined physical-chemical methods, or may utilize the addition of an electrolyte to the suspension or to the impacted mixture for adjustment of the pH of its liquid phase.

As a result, upon coming to rest in the settling tank, the solids will flocculate rapidly forming a spongy agglomerate in which the microscopic bubbles of gas are entrapped. This agglomerate with its solids has sufficient buoyancy so that it remains at the top of the liquid level within the settling tank while the clarified liquid seeps downwardly therethrough. The clarified liquid may then be drawn off from beneath the spongy agglomerate by inverted decantation.

It is thus a principal object of the invention to provide a continuously operative method and apparatus which produces a separation of colloidal particles from the liquid phase in which they are suspended and more particularly in those situations where the effective density of the suspended colloidal solid particles is nearly equal to the density of the liquid phase.

The process according to the invention is not a "flotation" process either since in the latter the aerophile particles attach themselves to large foam bubbles which have necessarily to be produced.

Accordingly, in a "flotation" it is indispensible to produce an abundant foam to which the particles to be subjected to flotation attach themselves, whereas according to the invention the production of a foam is undesirable, while it is on the other hand absolutely necessary that the solid particles may flocculate by the addition of an electrolyte to the liquid to be clarified.

The "flotation" is based on the action of surface tensions between the aerophobe liquid and the aerophile solid substances which are rendered non-wettable by the liquid by the addition of a suitable reagent.

Assuming one has to treat a mixture of grains of coal and of gangue situated in an aqueous medium, and that it is desired to subject the carbon grains to an operation of "flotation," it is necessary to form foam bubbles of a size sufficient (this requires the addition of a foaming agent) for the coal grains which attach themselves to them to be made to float.

This "flotation" is carried out in such a manner that the coal grains are not wetted by the water whereas on the other hand the gangue is wetted.

This can be attained by enveloping the coal grains with a heteropolar oil which acts, on the one hand, as a hydrophobe agent towards the water, and on the other hand as an aerophile agent towards the air, while the gangue remains wettable because it is hydrophile.

As a consequence of the surface tensions the carbon particles attach themselves to the foam which has to be produced, whereas the gangue drops (downwardly) in the liquid treated, and owing to these facts, the separation of carbon and gangue is carried out.

It is essential that one substance (the gangue) can be wetted whereas the other (coal grains) can not be wettable.

It is moreover essential that there is in the "flotation" a production of foam, and that the foam bubbles formed are of a sufficient size in order that the coal grains fixed to them are carried to the surface. In fact, the air bubbles constituting eventually the foam have dimensions markedly exceeding those of the carbon grains which adhere to them owing to their aerophile character.

The present invention has nothing in common with conventional "flotation": it is based exclusively on the fact that the solids in suspension or in solution in a mother-liquor flocculate rapidly by the addition of an electrolyte thereto.

The flocculation is carried out according to the invention in a medium containing micro-bubbles of air uniformly dispersed in the mother-liquor and having very small sizes (micro-bubbles) which have the effect that they are imprisoned in the nascent floccules by the action of the electrolyte.

The flocculation is naturally an agglomeration of solid particles, colloidal or pseudo-colloidal, which form themselves into floccules, and the latter group themselves eventually into a mass of micellae.

Before flocculation the particles remain separate from one another: or at least they have but little affinity to one another, but when their electrostatic charge is modified by the addition of an electrolyte (acid, base or salt, as the case may be), the agglomeration of the floccules takes place, and any repellent force between the solid particles disappears. At the moment of the flocculation the physical forces of cohesion become preponderant, and determine finally the formation of the mass of micellae.

In all cases of "flotation," the solids (for example the coal grains) can float only because they are or are rendered aerophile, that is to say that they possess or acquire the affinity to adhere to air: this is accordingly the reason why they attach themselves to the foam bubbles.

On the contrary, the colloidal flocculated particles float, after the treatment according to the invention because at the moment of the flocculation they imprison in their midst micro-bubbles of air (air bubbles having microscopic size) dispersed in the liquid mass and uniformly in the latter.

Various other objects, features and advantages of the invention will become apparent upon reading the following specification together with the accompanying drawings forming a part thereof.

Referring to the drawings, FIGURE 1 is a diagrammatic elevational view of an embodiment of dispensing and impacting apparatus connected to a settling tank.

FIGURES 1 and 3 relate to a preferred embodiment in which the electrolyte is added immediately after dispersing and impacting.

FIGURE 2 relates to a detail.

FIGURE 4 relates to a plant in which the addition of electrolyte takes place before the dispersing and impacting step.

In practice the process is preferably carried out by a plant such as the one represented by FIGURE 1.

In this figure there has been shown at A a centrifugal apparatus described and claimed in U.S. Patent 2,657,025 dated October 27, 1953 and comprising a rotary cylinder 51 which is in the interior of a stationary envelope 52 forming a base and resting by means of griders 53 on a solid foundation 54 of masonry work.

The upper portion of the rotary cylinder 51, which is driven by means of the motor M, is in the shape of a bell 55, and rests on a mushroom 56 which is provided with an axle 56a rotating in the interior of a tubular support 57. The support 57 is in turn supported by a plurality of arms 57a connected at their outer ends to the envelope 52.

Between the cylinder 51 and the mushroom 56 vanes 56' are provided which interconnect parts 1 and 57 and allow on the one hand imparting to the liquid the speed of the cylinder, and on the other hand aspiration of some air.

The liquid to be treated is supplied through a pipe 58 into a reservoir formed by an envelope 59 and resting on the base of the machine, and is directed towards the rotary cylinder 51 by an orifice 60 provided in a bottom 59' and determining the rate of feed into the centrifugal apparatus. The air is aspirated through apertures 61 formed in the envelope 59.

The air and the liquid are carried along simultaneously by the vanes 56', and these two fluids spread out on the inner face of the rotary cylinder 51 and escape at the lower portion after having been stirred on the impact faces 62.

The liquid resulting from this treatment is in practice a homogenous emulsion (air-liquid) the physical characteristics of which are totally different from those of the raw liquid treated (as regards viscosity, density, conductivity of heat and electricity, etc.).

The homogeneous emulsion drops onto an inclined plane 63 and is received in the settling reservoir 64 which, in the embodiment illustrated, has a conical bottom 65 which allows the sliding towards a drain conduit 66 of heavy bodies incapable of flocculation (sand, earth, etc.) which might have been carried along incidentally by the raw liquid and before being extracted from the decanter.

The flowing off of the mixture over the inclined plane 63 takes place in a laminer state in order to keep up the emulsion in a homogeneous state until its arrival in the calm zone constituted by the settling tank 64.

According to an important feature, the electrolyte is introduced into the mixture after the dispersion of the solids and of air or gas, in order to generate a flocculation enveloping the same which incorporates physically dispersed gaseous micro-bubbles in the ionised floccules.

In the embodiment represented in FIGURE 2, the electrolyte is supplied through a conduit 67 below the plane of laminar flow of the centrifugal raw liquid in order to assure as perfect a contact as possible between the electrolyte and the liquid to be flocculated.

The conduit 67 is usually put into communication with a reservoir 68 provided with a float 69.

The rate of supply of the centrifugal apparatus being constant, the quantity of electrolyte to be introduced for the operation is controlled by the aid of a control means (for example a cock 67') provided on the discharge pipe of the electrolyte.

Preferably the mixture between the electrolyte and the liquid is assisted by a strip 20 which forms a baffle and which is disposed perpendicular to the direction of the flow.

The bottom and/or the lateral face of the settling tank 64 may be provided with a double wall 21 allowing the circulation of a heating or temperature controlling agent. This agent may be steam or lukewarm water.

At 22 a steam inlet, and at 23 an outlet of this steam is shown, and at 24 a drain for the condensed water.

The reservoir 64 is provided in its centre with a riser pipe 25 the base of which is integral with the bottom 65 of the settling tank, and which may carry on top a cone 26.

Above the riser pipe 25 and at the upper portion of the reservoir 64 there is provided a skimmer 27 driven by means of a shaft 28 by a speed reduction gearing 29 driven by an electric motor 30.

The last mentioned components rest on two griders 31 (FIGURES 1 and 2) forming a bridge on the vessel 64.

Between the riser pipe 25 and the reservoir 64 there are provided four, or any appropriate number of braces 32 (FIGS. 1 and 2) which have the object of centering the riser pipe 25 and to prevent the agglomerate from rotating above the decanted liquid under the action of the skimmer 27.

The discharge of the clarified liquid, the level of which is represented at N in the reservoir 64 takes place through a conduit 35 (FIGURE 1) ending in an air lock 36. This discharge can be controlled by means of a shiftable sleeve 37 mounted on the end of the pipe 35 and penetrating into the air lock through the bottom of the latter, so as to extend finally in the vertical direction.

The agglomerate of air and floccules or gas and floccules is forced by the skimmer 27 to drop into the riser pipe 25.

This riser pipe discharges at the lower end towards the suction of the de-aeration pump 38, the discharge pipe 39 of which leads to a heater or heat exchanger of any type desired diagrammatically indicated in the embodiment represented at 40.

At 41 the entry of the heating fluid, at 42 the exit of this fluid after condensation, and at 43 the exit of the reheated slurry are shown.

After its arrival in settling tank 15—64 the impacted mixture of suspended colloidal solids, microscopic bubbles of air or gas, and the liquid phase in which they are disposed comes to a substantially complete rest. As stated above, the colloidal suspension has ben conditioned, if required, so that the suspended colloidal particles are capable of coagulation and therefore tend to flocculate together as soon as the impacted emulsified suspension comes to rest in the settling tank. As the colloidal particles aggregate and come together in the retention zone atop the liquid level in the settling tank forming flocs, they assemble coagulatively carrying with them and entrapping at least a portion of the dispersed microscopic bubbles of gas or air. This results in the production of a spongy flocculated agglomerate having an effective density appreciably less than either of the substantially equal densities of the solid colloidal particles or the liquid phase in which they are suspended. The agglomerate thus formed acquires a buoyancy which causes it to remain above the liquid in the settling tank thus permitting the agglomerate to be skimmed off.

During the course of this flocculation, the liquid phase seeps downwardly through the buoyant spongy agglomerate so that the liquid may be drawn off in a clarified condition through the outlet 19—35 located at the bottom of settling tank below the agglomerate.

Where it is desired to use a gas other than air at atmospheric pressure for the impacting operation, the enclosure member 52 of FIG. 1 will be arranged to be gas tight, and the gas or air may be introduced therein at whatever pressure desired.

It is to be noted, however, that the pressure of the gaseous medium above the liquid in the settling tank is shown as being atmospheric pressure which is the same pressure and is at least as great as the gaseous presure ued during the impacting operation. In this manner, appreciable expansion of the microbubbles in the settling tank is avoided, since this might produce turbulent effects which would interfere with the desired assembly and flocculation of the colloidal particles. It will also be appreciated that in order to permit entrapment of bubbles by the coagulating colloidal particles, the bubbles must necessarily be of microscopic size at the time of such entrapment. Expansion of the bubbles prior to entrapment must therefore be prevented, not only to prevent turbulence, but also to maintain the microscopic original size of the bubbles which allows them to be entrapped effectively during coagulation. If a pressure other than atmospheric pressure is used, enclosure of the settling tank may be required to maintain this higher gas pressure at the place where the flocs are formed.

FIGURE 3 relates to a modified embodiment in which the electrolyte is distributed by means of a rotary dish 76 which is driven by a motor 76′ and which functions to throw off the electrolyte just below the impact zone formed by the faces 52 and accordingly strictly after the operation of dispersion.

This dispersion allows the use of liquid, powdery or granular electrolytes the quantities of which can be controlled by a pH meter 77 acting directly on a control mechanism controlling the supply of the electrolyte or alternatively on a servo motor acting on the distributor for the electrolyte. The electrodes 78 of the pH meter are preferably arranged slightly downstream of the mixing zone of the electrolyte and the dispersed mixture.

FIGURE 4 shows a simultaneous introduction of the raw liquid and of the electrolyte into the dispersion centrifuge by the conduits 80 and 67 respectively. This is applicable with liquids in which the electrolyte does not react simultaneously for generating a flocculation the latter taking place after the dispersion on the impact faces and during the period of decantation.

The result obtained when the electrolyte is added after impactation may be observed when consideration is taken about the speed at which the aggomerate of flocs and microbubbles of air ascends in the settling tank towards the upper level.

From the following table it is shown that this speed is about three times superior when the electrolyte is added immediately after impactation than when this introduction takes place before the dispersing operation.

Column I indicates the time (minute). Column II indicates the quantities of liquid having become clear when electrolyte is added before dispersing. Column III indicates the quantities of liquid having become clear when electrolyte is added immediately after dispersing.

| I | II | III |
| --- | --- | --- |
| 1 | 5 | 155 |
| 2 | 10 | 210 |
| 3 | 25 | 230 |
| 4 | 40 | 255 |
| 5 | 55 | 300 |
| 6 | 75 | 320 |
| 7 | 95 | 330 |
| 8 | 110 | 345 |
| 9 | 130 | 360 |
| 10 | 145 | 380 |
| 15 | 220 | 415 |
| 20 | 255 | ------- |
| 25 | 285 | ------- |
| 30 | 310 | 465 |
| 40 | 335 | ------- |
| 50 | 355 | ------- |
| 60 | 365 | ------- |
| 75 | 375 | ------- |
| 90 | 385 | ------- |

What I claim is:
1. Apparatus for separating solid particles capable of flocculation from a liquid, comprising: a vertical axis cylinder open over substantially its entire bottom area, means supporting said cylinder for rotation about its vertical axis, means for rotating said cylinder at relatively high peripheral speeds, means for introducing a liquid carrying solid particles therein into the upper portion of said cylinder, means for directing said liquid into contact with the upper inner walls of said cylinder for downward flow over the inner walls of said cylinder, a chamber surrounding said cylinder, means defining impact surfaces perpendicularly arranged around the lower edge of said cylinder, whereby both the liquid flowing downwardly past the lower edge of said cylinder and gas within said chamber flowing into said cylinder are simultaneously thrown in relatively thin sheet form at high velocity against said impact surfaces, a rotary vertical axis dish disposed immediately below said cylinder, means for rotating said dish, and means for introducing an electrolyte into said dish for addition to said liquid by a centrifugal distribution action produced by the rotation of said dish.

2. Apparatus according to claim 1, said cylinder and said dish being substantially coaxial.

3. Apparatus according to claim 1 additionally comprising means underlying said dish for providing a steeply inclined surface for directing the flow of the liquid laterally and downwardly away from the area beneath said cylinder and dish.

(References on following page)

References Cited in the file of this patent

UNITED STATES PATENTS

| | | |
|---|---|---|
| 2,203,718 | Burch | June 11, 1940 |
| 2,220,574 | Little et al. | Nov. 5, 1940 |
| 2,446,655 | Lawrason | Aug. 10, 1948 |
| 2,657,025 | Henrard | Oct. 27, 1953 |

FOREIGN PATENTS

| | | |
|---|---|---|
| 435,954 | Great Britain | Oct. 2, 1935 |
| 491,623 | Great Britain | Sept. 6, 1938 |